United States Patent
Deshpande et al.

(10) Patent No.: US 10,999,644 B2
(45) Date of Patent: May 4, 2021

(54) METHODS, SYSTEMS, AND MEDIA FOR PRESENTING MEDIA CONTENT

(71) Applicant: Google LLC, Mountain View, CA (US)

(72) Inventors: Vinit Deshpande, San Jose, CA (US); Kishore Subramanian, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/976,621

(22) PCT Filed: Sep. 17, 2019

(86) PCT No.: PCT/US2019/051487
§ 371 (c)(1),
(2) Date: Aug. 28, 2020

(87) PCT Pub. No.: WO2020/061027
PCT Pub. Date: Mar. 26, 2020

(65) Prior Publication Data
US 2021/0051377 A1    Feb. 18, 2021

Related U.S. Application Data

(60) Provisional application No. 62/733,030, filed on Sep. 18, 2018.

(51) Int. Cl.
*G06F 15/16*         (2006.01)
*H04N 21/63*         (2011.01)
(Continued)

(52) U.S. Cl.
CPC ......... *H04N 21/632* (2013.01); *H04L 65/608* (2013.01); *H04L 67/02* (2013.01); *H04L 67/104* (2013.01)

(58) Field of Classification Search
CPC ... H04L 65/608; H04L 67/102; H04L 67/104; H04N 21/632
(Continued)

(56) References Cited

U.S. PATENT DOCUMENTS

| 7,912,503 B2 | 3/2011 | Chang et al. |
| 9,143,341 B2 | 9/2015 | Harrang et al. |

(Continued)

*Primary Examiner* — Moustafa M Meky
(74) *Attorney, Agent, or Firm* — Byrne Poh LLP

(57) ABSTRACT

Methods, systems, and media for presenting media content are provided. In some embodiments, the method comprises: receiving, at a streaming media device connected to a display device, an instruction, from a mobile phone communicatively coupled with the streaming media device using a peer-to-peer networking protocol, to launch an application for presenting media content on the display device; in response to receiving the instruction, transmitting a request to a media content sharing service associated with the application for presenting media content to render a video player on the display device; receiving, from the mobile phone, an instruction to present a media content item on the display device using the video player; transmitting, to the mobile phone, a request for a first portion of the media content item, wherein a plurality of portions of the media content item including the first portion have been previously downloaded to the mobile phone; receiving, from the mobile phone, the first portion of the media content item using the peer-to-peer networking protocol; storing the first portion of the media content item in memory of the streaming media device; and causing the first portion of the media content item to be presented on the display device using the video player by playing the stored first portion of the media content item from the memory of the streaming media device.

21 Claims, 7 Drawing Sheets

(51) Int. Cl.
*H04L 29/06* (2006.01)
*H04L 29/08* (2006.01)

(58) Field of Classification Search
USPC .......................................................... 709/231
See application file for complete search history.

(56) References Cited

U.S. PATENT DOCUMENTS

| | | |
|---|---|---|
| 9,244,916 B2 | 1/2016 | Berger et al. |
| 10,637,902 B2 * | 4/2020 | Kotab ..................... H04W 4/08 |
| 2015/0201023 A1 * | 7/2015 | Kotab ..................... H04L 65/60 |
| | | 709/208 |
| 2017/0311040 A1 * | 10/2017 | Barnes ............... H04N 21/4325 |
| 2018/0160199 A1 * | 6/2018 | Kring ................... H04L 65/602 |
| 2020/0213376 A1 * | 7/2020 | Kotab ..................... H04W 4/08 |

* cited by examiner

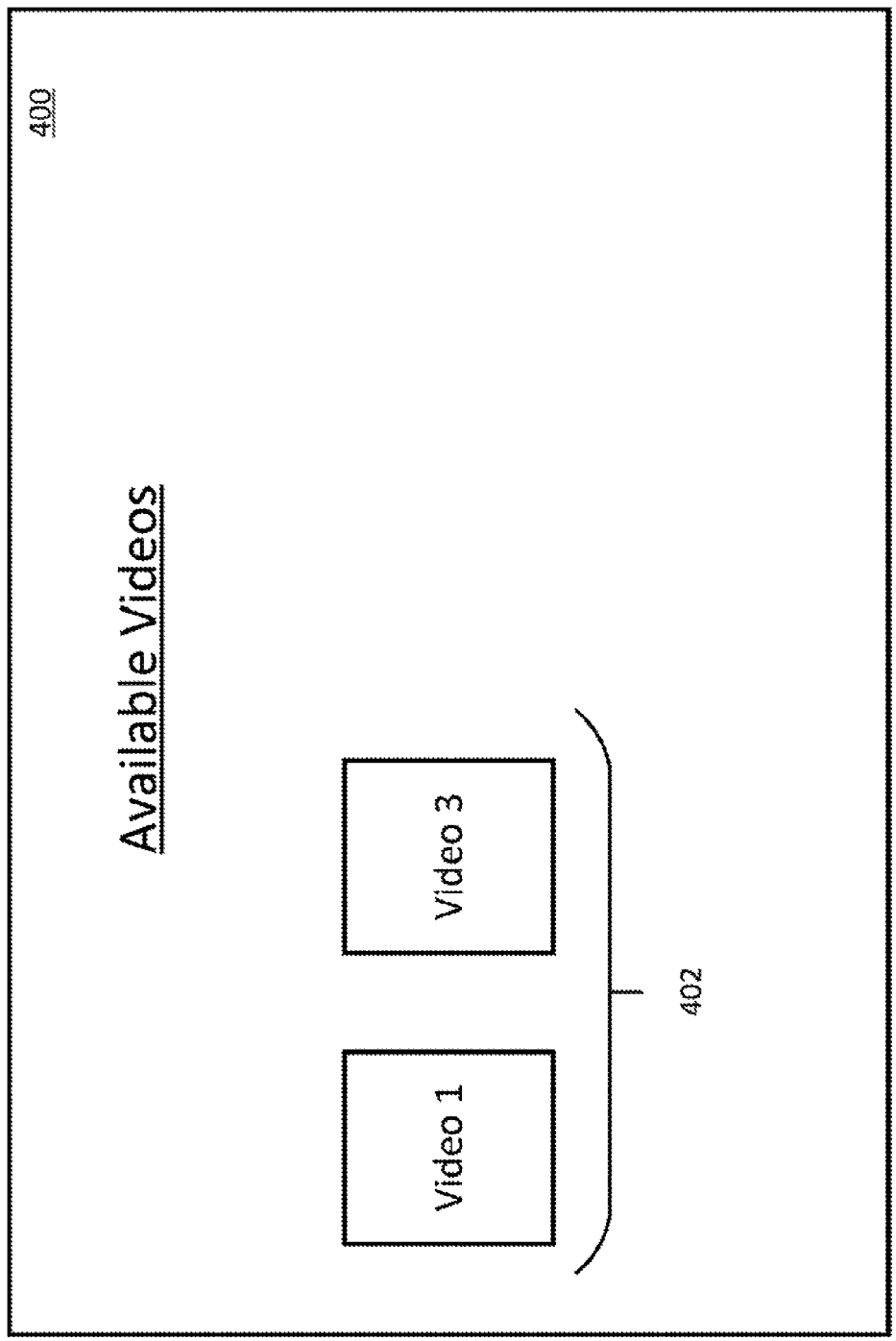

METHODS, SYSTEMS, AND MEDIA FOR PRESENTING MEDIA CONTENT

CROSS-REFERENCE TO RELATED APPLICATION

This application claims the benefit of U.S. Provisional Patent Application No. 62/733,030, filed Sep. 18, 2019, which is incorporated by reference herein in its entirety.

TECHNICAL FIELD

The disclosed subject matter relates to methods, systems, and media for presenting media content.

BACKGROUND

Many users are interested in viewing media content, such as videos, television programs, movies, etc. that are selected on a mobile device, such as a smartphone, on a television device or other display device. For example, a user may want to select a particular media content item, such as a video, on the user's phone, and view the selected media content item on the user's television. In some cases, the mobile phone and the television may both be connected to a communication network, such as a Wi-Fi network in the user's home. However, in other cases, a Wi-Fi access point may not be accessible for the television (or to a streaming media device connected to the television), which can make it difficult for the television device to play a selected media content item. In other cases, the television or streamlining media device may have a network connection, but the connection may be unreliable. This can be a particular issue in some rural areas, which often have sparse and/or unreliable communication networks.

Accordingly, it is desirable to provide new methods, systems, and media for presenting media content.

SUMMARY

Methods, systems, and media for presenting media content are provided.

In accordance with some embodiments of the disclosed subject matter, a method for presenting media content is provided, the method comprising: receiving, at a streaming media device connected to a display device, an instruction, from a mobile phone communicatively coupled with the streaming media device using a peer-to-peer networking protocol, to launch an application for presenting media content on the display device; in response to receiving the instruction, transmitting a request to a media content sharing service associated with the application for presenting media content to render a video player on the display device; receiving, from the mobile phone, an instruction to present a media content item on the display device using the video player; transmitting, to the mobile phone, a request for a first portion of the media content item, wherein a plurality of portions of the media content item including the first portion have been previously downloaded to the mobile phone; receiving, from the mobile phone, the first portion of the media content item using the peer-to-peer networking protocol; storing the first portion of the media content item in memory of the streaming media device; and causing the first portion of the media content item to be presented on the display device using the video player by playing the stored first portion of the media content item from the memory of the streaming media device.

By presenting content in this way, issues due to poor or non-existent network connections can be reduced. For example, media content items may be previously downloaded over a long period of time, or downloaded over a different connection at another location, and then presented to the display device connected to the streaming media device (which may be a standalone device or may be embedded within a television) without the bandwidth and connection requirements typically required for streaming content (such as music or videos) from a content provider or content sharing service. Access to content can therefore be improved without the need for fast and/or reliable network connections.

In some embodiments, the request to the media content sharing service is transmitted from the mobile phone. In some embodiments, the streaming media device may transmit a request to the mobile phone, in response to receiving the instruction, to cause the mobile phone to transmit the request to the media content sharing service to render a video player on the display device.

In some embodiments, the request to the media content sharing service is transmitted using an HTTP proxy server executing on the mobile phone.

In some embodiments, the method further comprises receiving HTTP proxy server identifier information from the mobile phone and connecting to the HTTP proxy server executing on the mobile phone prior to receiving the instruction to launch the application.

In some embodiments, the peer-to-peer networking protocol is a wireless fidelity (WiFi) direct protocol.

In some embodiments, the instruction to present the media content item is received via a selection of an indication of the media content item via a user interface presented on the display device, wherein the user interface presents indications of a plurality of media content items previously stored on the mobile phone that are available for presentation on the display device.

In some embodiments, determining an amount of storage space available in the memory of the streaming media device, wherein the first portion of the media content item is inhibited from being stored in the memory of the streaming media device based on the determination.

In some embodiments, the method further comprises: transmitting an instruction to the mobile phone to retrieve an update file corresponding to an operating system executing on the streaming media device; receiving, from the mobile phone, the update file using the peer-to-peer networking protocol; storing the update file in the memory of the streaming media device; and executing the update file from the memory of the streaming media device that causes the operating system of the streaming media device to be updated.

In some embodiments, the portions of the media content item previously downloaded to the mobile phone are portions of a media content item associated with the media content sharing service. The portions of the media content item may have been previously downloaded from the media content sharing service at an earlier time, or downloaded and at least temporarily stored at the mobile phone as part of a current streaming operation performed at the mobile phone, in which content is streamed from the media content sharing service. It will be understood that downloading and temporarily storing the media content item (i.e. buffering the media content item at the mobile phone whilst streaming) can help facilitate access to content in cases where a Wi-Fi access point may not be accessible to the streaming media device. Downloading the media content item at a previous period of time (i.e. an hour before, the day before, the week before, etc.) can help facilitate access to content in cases where a network connection is available to the streaming media device, but that connection is unreliable or slow. Using previously downloaded content, in either scenario, can reduce latency in the current presentation of the media content.

In some embodiments, the method further comprises, prior to transmitting the request for a first portion of the media content: downloading at least some of the plurality of portions of the media content item including the first portion to the mobile phone. Optionally, the downloading comprises downloading the portions of the media content item from any suitable source, optionally, from the media content sharing (or streaming) service. The downloading can be at a previous point in time during a separate download operation (in which case all of the media content item may be downloaded and stored at the mobile phone), or as part of a current streaming operation (in which case the downloading can be part of a buffering process, and only some of the portions of the media content may be downloaded and stored at the mobile phone at any one time). The first portion of the media content item is thus content that has been previously downloaded, i.e. that has been downloaded to the mobile phone before being transmitted from the mobile phone to the streaming media device (as compared to content generated on or at the phone).

In accordance with some embodiments of the disclosed subject matter, a system for presenting media content is provided, the system comprising a memory and a hardware processor of a streaming media device that is configured to: receive, at a streaming media device connected to a display device, an instruction, from a mobile phone communicatively coupled with the streaming media device using a peer-to-peer networking protocol, to launch an application for presenting media content on the display device; in response to receiving the instruction, transmit a request (optionally via the mobile phone) to a media content sharing service associated with the application for presenting media content to render a video player on the display device; receive, from the mobile phone, an instruction to present a media content item on the display device using the video player; transmit, to the mobile phone, a request for a first portion of the media content item, wherein a plurality of portions of the media content item including the first portion have been previously downloaded to the mobile phone; receive, from the mobile phone, the first portion of the media content item using the peer-to-peer networking protocol; store the first portion of the media content item in memory of the streaming media device; and cause the first portion of the media content item to be presented on the display device using the video player by playing the stored first portion of the media content item from the memory of the streaming media device.

In accordance with some embodiments of the disclosed subject matter, computer program product or a non-transitory computer-readable medium containing computer executable instructions that, when executed by a processor, cause the processor to perform a method for presenting media content is provided, the method comprising: receiving, at a streaming media device connected to a display device, an instruction, from a mobile phone communicatively coupled with the streaming media device using a peer-to-peer networking protocol, to launch an application for presenting media content on the display device; in response to receiving the instruction, transmitting a request to a media content sharing service associated with the application for presenting media content to render a video player on the display device; receiving, from the mobile phone, an instruction to present a media content item on the display device using the video player; transmitting, to the mobile phone, a request for a first portion of the media content item, wherein a plurality of portions of the media content item including the first portion have been previously downloaded to the mobile phone; receiving, from the mobile phone, the first portion of the media content item using the peer-to-peer networking protocol; storing the first portion of the media content item in memory of the streaming media device; and causing the first portion of the media content item to be presented on the display device using the video player by playing the stored first portion of the media content item from the memory of the streaming media device. The instructions may also cause the processor perform any embodiment of the method described herein.

In accordance with some embodiments of the disclosed subject matter, a system for presenting media content is provided, the system comprising: means for receiving, at a streaming media device connected to a display device, an instruction, from a mobile phone communicatively coupled with the streaming media device using a peer-to-peer networking protocol, to launch an application for presenting media content on the display device; means for transmitting a request to a media content sharing service associated with the application for presenting media content to render a video player on the display device in response to receiving the instruction; means for receiving, from the mobile phone, an instruction to present a media content item on the display device using the video player; means for transmitting, to the mobile phone, a request for a first portion of the media content item, wherein a plurality of portions of the media content item including the first portion have been previously downloaded to the mobile phone; means for receiving, from the mobile phone, the first portion of the media content item using the peer-to-peer networking protocol; means for storing the first portion of the media content item in memory of the streaming media device; and means for causing the first portion of the media content item to be presented on the display device using the video player by playing the stored first portion of the media content item from the memory of the streaming media device. The system may also comprise means for performing any embodiment of the method described herein.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

FIG. 4 shows an example of a user interface that can be presented on a display device connected to a streaming media device that indicates available media content for presentation in accordance with some embodiments of the disclosed subject matter.

DETAILED DESCRIPTION

Figure 1:
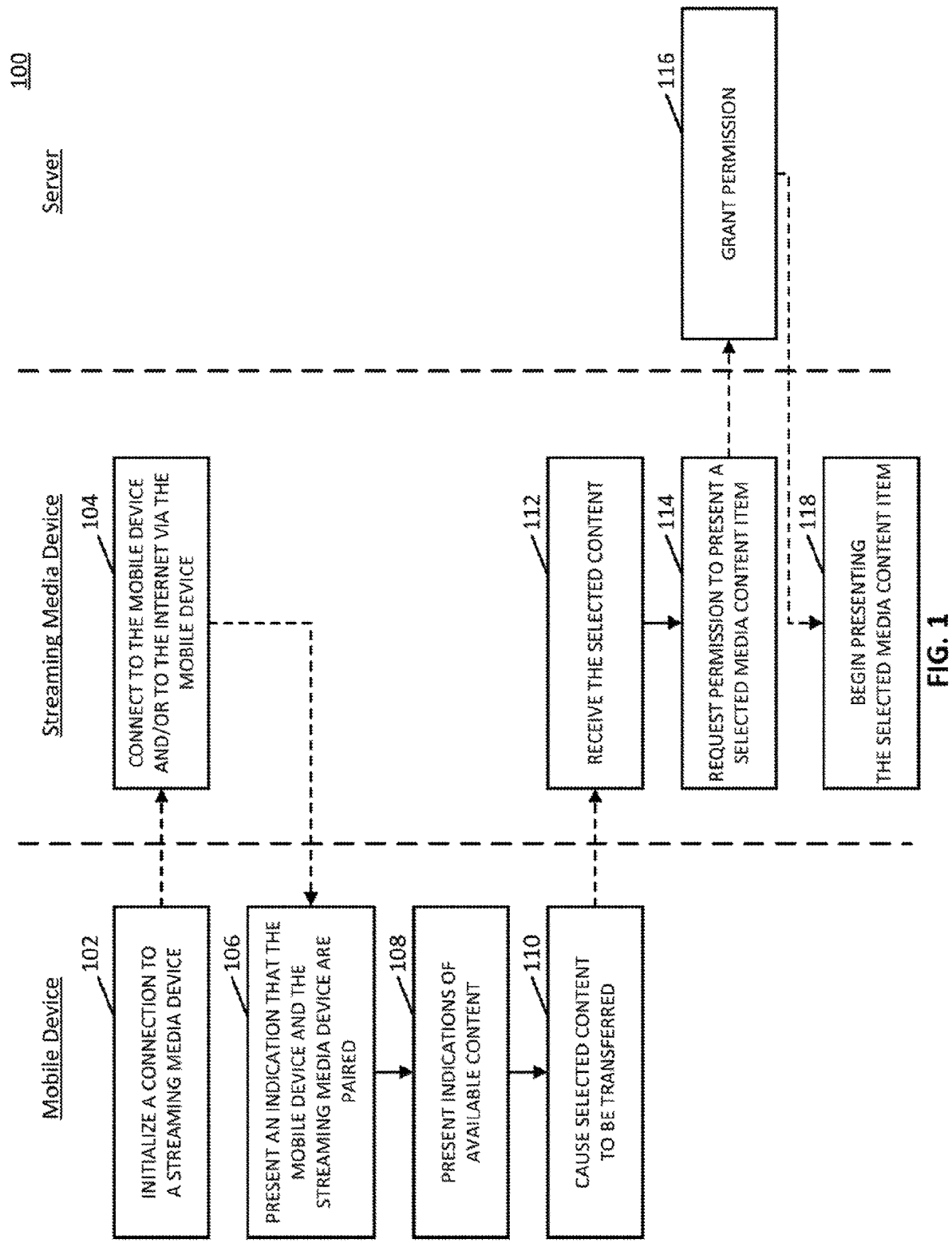
FIG. 1 shows an example of an information flow diagram for transferring media content to a streaming media device and presenting media content using the streaming media device in accordance with some embodiments of the disclosed subject matter.

In accordance with various embodiments, mechanisms (which can include methods, systems, and media) for presenting media content are provided.

In some embodiments, the mechanisms described herein can be used to cause media content to be presented on a display device connected to a streaming media device. In some embodiments, the streaming media device can be any suitable device, such as a storage device or dongle connected to the display device in any suitable manner (e.g., via an HDMI connection, and/or in any other suitable manner). In some embodiments, the media content presented on the display device can be any suitable type of media content, such as videos, television programs, movies, photos, slideshows, documents, audio content, and/or any other suitable type of media content.

In some embodiments, the media content can be presented on the display device connected to the streaming media device via a mobile device (e.g., a mobile phone, a tablet computer, a wearable computer, a laptop computer, and/or any other suitable type of mobile device) that is paired with the streaming media device. For example, in some embodiments, the mobile device and the streaming media device can be paired using any suitable peer-to-peer networking connection (e.g., WiFi Direct, WiFi Aware, and/or any other suitable type of peer-to-peer networking connection). In some such embodiments, media content can be transferred to the streaming media device from the mobile device via the peer-to-peer networking connection. For example, in some embodiments, the media content can be media content that has been stored on the mobile device and is transferred to the streaming media device for presentation on the connected display device. As a more particular example, in some embodiments, the media content can be user-generated media content stored on and/or media content generated on the mobile device, such as photos and/or videos captured on the mobile device, documents generated on the mobile device, and/or any other suitable media content. As another more particular example, in some embodiments, the media content can be media content that was downloaded to the mobile device from any suitable source, such as a media content sharing and/or streaming service, from another user device, and/or from any other suitable source. In some embodiments, by transferring media content stored on the mobile device and/or previously downloaded to the mobile device, the mechanisms described herein can allow a user to cause presentation of media content on the display device connected to the streaming media device without requiring a WiFi access point for the streaming media device. In particular, in some embodiments, the mechanisms can allow a user to download media content to the mobile device (e.g., using a cellular network, using a WiFi network, and/or in any other suitable manner) and transfer the downloaded media content to the streaming media device for presentation on the display device at a later time.

In some embodiments, any internet connection to be used by the streaming media device (e.g., to request keys and/or permission to present protected or encrypted content, to stream media content from a server, and/or for any other suitable purpose) can be provided by the mobile device. For example, in some embodiments, the mobile device can be configured to execute an HTTP proxy server, which can be used by the streaming media device as a hotspot to connect to a server (e.g., a server associated with a media content sharing and/or streaming service). In some such embodiments, access to a network via an HTTP proxy server executing on the mobile device can allow the streaming media device to request and/or receive any suitable information or media content for rendering the media content stored on the mobile device without access to a WiFi access point. For example, the streaming media device may request and/or receive permissions or access credentials for media content downloaded or streamed from certain media content streaming or sharing services, and/or information regarding the relevant codecs for playing the media content item. Access to content may therefore be improved.

Turning to FIG. 1, an example 100 of an information flow diagram for transferring media content to a streaming media device from a mobile device is shown in accordance with some embodiments of the disclosed subject matter. As illustrated, in some embodiments, blocks of process 100 can be executed on a mobile device, a streaming media device connected to a display device, and/or a server. Note that, in some embodiments, the streaming media device can be a device that is connected to any suitable display device (e.g., a television, a projector, and/or any other suitable type of display device) in any suitable manner (e.g., via an HDMI connection, and/or in any other suitable manner).

At 102, the mobile device can initialize a connection to the streaming media device. For example, in some embodiments, the mobile device can initialize a communication channel that communicatively couples the mobile device and the streaming media device, such as a peer-to-peer connection (e.g., a WiFi Direct connection, a WiFi Aware connection, and/or any other suitable type of connection). As a more particular example, in some embodiments, the mobile device can initialize a WiFi Direct or WiFi Aware connection with the streaming media device using any suitable API(s) to initialize the WiFi Direct or WiFi Aware connection and retrieve a Service Set Identifier (SSID) and passphrase associated with the WiFi Direct or WiFi Aware connection. In some embodiments, the mobile device can then transmit the SSID (e.g., transmitted by the mobile device using beacons, and/or in any other suitable manner), which can be detected by the streaming media device.

As another example, in some embodiments the mobile device can initialize an HTTP proxy server that can execute on the mobile device. As a more particular example, in some such embodiments, the mobile device can transmit a multicast DNS (mDNS) message that can indicate any suitable information, such as an IP address associated with the mobile device, and/or any other suitable information. In some such embodiments, the streaming media device can access the internet via the HTTP proxy server executing on the mobile device, as described below in more detail.

Figure 3B:
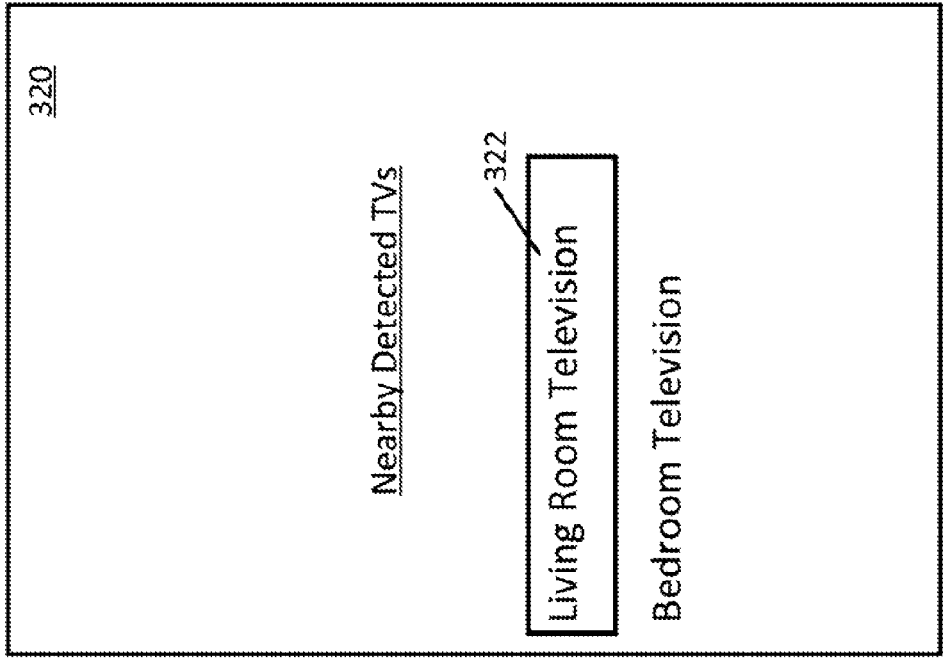
FIGS. 3A-3D show examples of user interfaces for pairing a mobile device and a streaming media device and transferring media content from the mobile device to the streaming media device.
Figure 3A:
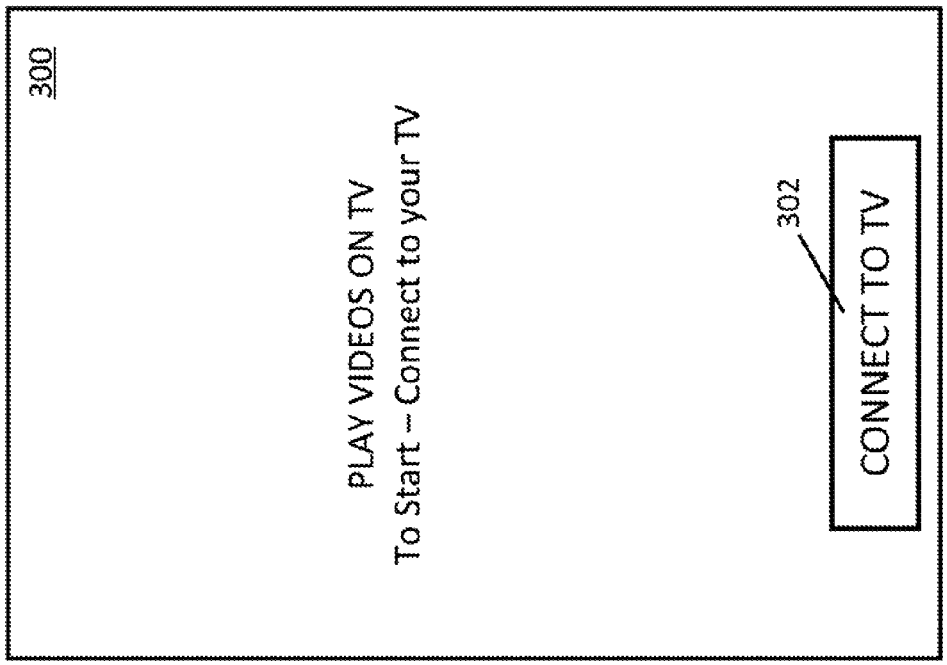

Note that, in some embodiments, the mobile device can initialize the connection to the streaming media device based on any suitable information. For example, in some embodiments, the mobile device can initialize the connection in response to receiving an indication that the connection to the streaming media device is to be initialized via a user interface presented on the mobile device. Turning to FIGS. 3A and 3B, examples 300 and 320 of user interfaces for initializing connections to the streaming media device are shown in accordance with some embodiments of the disclosed subject matter. As illustrated in FIG. 3A, user interface 300 can include a selectable input 302 that, when selected, can begin a device discovery process that identifies nearby display devices connected to nearby streaming media devices. In some embodiments, user interface 320 can be presented in response to the mobile device detecting one or more nearby display devices each connected to one or more nearby streaming media devices. For example, as illustrated in FIG. 3B, user interface 320 can indicate detected display devices (e.g., "living room television," "bedroom television," and/or any other suitable detected devices). In some such embodiments, an indication 322 of a detected device can be a selectable input that, when selected, causes the mobile device to begin transmitting any suitable information (e.g., an SSID and/or passphrase, an mDNS message, and/or any other suitable information as described above) that can be detected by a streaming media device connected to an indicated display device.

Referring back to FIG. 1, at 104, the streaming media device can connect to the mobile device and/or to the internet via the initialized connection. For example, in some embodiments, the streaming media device can establish a WiFi Direct or WiFi Aware connection with the mobile device using the SSID and/or passphrase transmitted by the mobile device. As another example, in some embodiments, the streaming media device can connect to the internet using the HTTP proxy server executing on the mobile device using information included in the mDNS message.

At 106, the mobile device can present any suitable indication that the mobile device and the streaming media device and/or a display device connected to the streaming media device have been paired. For example, in some embodiments, the mobile device can present a user interface (not shown) that states "you are connected to the living room television," and or any other suitable message. In some embodiments, the indication can include information indicating that the mobile device and the streaming media device have successfully established a communication channel between the mobile device and the streaming media device, that the streaming media device can now access the internet via the mobile device (e.g., via an HTTP proxy server executing on the mobile device, and/or in any other suitable manner), and/or any other suitable information.

At 108, the mobile device can present indications of media content available for transfer to the streaming media device for presentation on a display device connected to the streaming media device. In some embodiments, the available media content can include any suitable type of media content. For example, in some embodiments, the media content can include user-generated media content that is stored on the mobile device. As a more particular example, in some embodiments, the user-generated media content can include photos captured by a camera associated with the mobile device, documents (e.g., text documents, slideshows, and/or any other suitable type(s) of documents) stored on the mobile device, videos captured by a camera associated with the mobile device, animations or other graphics generated by the mobile device, and/or any other suitable type of content. As another example, in some embodiments, the media content can include media content previously downloaded to the mobile device. As a more particular example, in some embodiments, the media content can include video content (e.g., videos, movies, television programs, and/or any other suitable type of video content) and/or audio content (e.g., music, audiobooks, radio programs, podcasts, and/or any other suitable type of audio content) downloaded to the mobile device from any suitable source (e.g., another user device, from a media content sharing or streaming service, and/or from any other suitable source).

In some embodiments, the mobile device can present the indications of available content in any suitable manner. For example, in some embodiments, the mobile device can present an indication of a number of media content items available on the mobile device (e.g., a number of items available for transfer to the streaming media device, and/or available in any other suitable manner). Turning to FIG. 3C, an example 350 of a user interface for presenting media content available for transfer to the streaming media device is shown in accordance with some embodiments of the disclosed subject matter. As illustrated, in some embodiments, user interface 350 can include a first selectable input 352 that, when selected, causes all media content items stored on the mobile device and/or all media content items stored in a particular folder of the mobile device to be transferred to the streaming media device. In some embodiments, first selectable input 352 can include an indication of a total number of media content items available for transfer to the streaming media device. Additionally or alternatively, in some embodiments, user interface 350 can include a second selectable input 354 that, when selected, can allow a user of user interface 350 to select a subset of the media content items available for transfer to the streaming media device.

Note that, in some embodiments, the indications of available content can correspond to media content that is available for streaming from a media content sharing and/or streaming service by the streaming media device rather than media content that is currently stored on the mobile device. In some such embodiments, the indications of available content can be presented in any suitable manner. For example, in some embodiments, the indications of available content can be indications of media content items that are available for streaming by the streaming media device to the display device connected to the streaming media device via a media content sharing and/or streaming service. As a more particular example, in some embodiments, the indications of available media content can be presented within an application associated with the media content sharing and/or streaming service that hosts the available media content. Note that, in instances where the indications of available media content corresponds to media content that is to be streamed from a media content sharing and/or streaming service, the media content can be streamed via the mobile device to the streaming media device, for example, by the streaming media device connecting to the internet to receive content from the service via an HTTP proxy server executing on the mobile device, as described below in more detail in connection with block 112. In other words, portions of the media content item to be streamed are downloaded and stored on the mobile phone temporarily as part of a buffering process of the during the streaming operation.

Figure 3D:
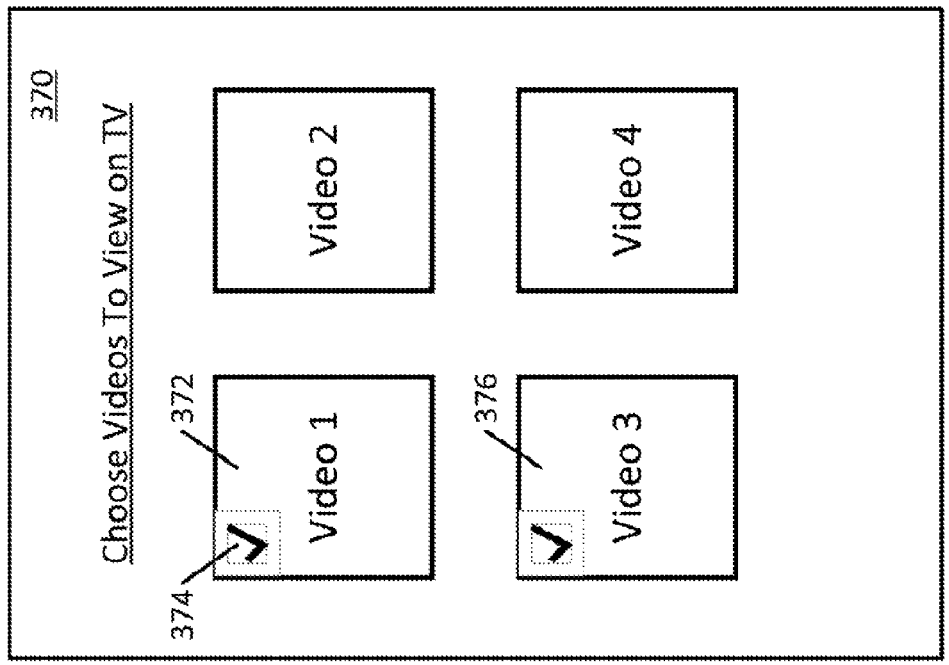
Figure 3C:
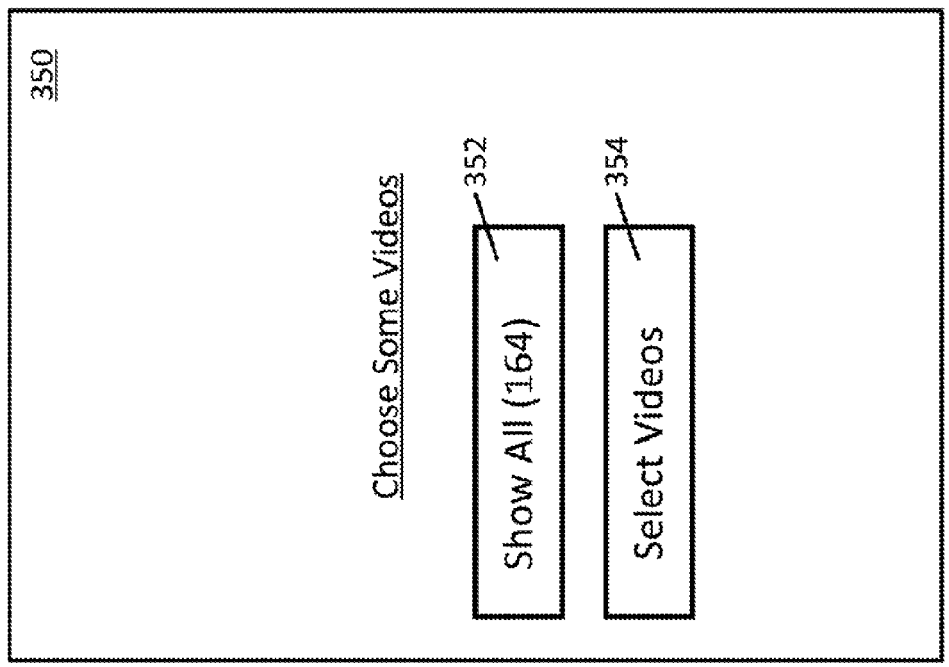

In some embodiments, selection of selectable input 354 can cause user interface 370 of FIG. 3D to be presented. In some embodiments, user interface 370 can include any suitable indications of available media content items, such as a group of thumbnail images (such as thumbnail 372) each representing an available media content item, as illustrated in FIG. 3D. In some embodiments, each thumbnail can be selected, and an indication of selection (e.g., a check mark 374) can be presented in response to a user selecting a particular thumbnail. In some embodiments, an indication of an available media content item can include any suitable information, such as an image associated with the media content item, a name of the media content item, a date associated with the media content item (e.g., a date of creation, a date the media content item was downloaded, and/or any other suitable date), episode information, a size of the media content item, and/or any other suitable information. Note that, although the indications of available media content item are shown in FIG. 3D as thumbnail images, in some embodiments, indications can be presented in any suitable manner, such as a list of file names of the media content items, and/or any other suitable manner.

Referring back to FIG. 1, at 110, the mobile device can cause selected media content items to be transferred to the streaming media device. For example, referring to FIG. 3D, the mobile device can cause media content items corresponding to thumbnail 372 and thumbnail 376 to be transferred to the streaming media device. In some embodiments, the mobile device can cause the selected media content items to be transferred to the streaming media device in any suitable manner and using any suitable technique(s). For example, in some embodiments, files corresponding to the selected media content items can be transferred via the peer-to-peer networking connection (e.g., a WiFi Direct connection, a WiFi Aware connection, and/or any other suitable peer-to-peer networking connection) established between the mobile device and the streaming media device, as described above in connection with blocks 102 and 104.

Note that, in some embodiments, the mobile device can be configured to automatically synchronize and transmit particular media content items to the streaming media device. For example, in some embodiments, the mobile device can be configured to automatically transmit user-generated videos, downloaded media content items associated with a particular media content streaming service, and/or any other suitable type of media content items to the streaming media device in response to detecting that the streaming media device has been detected by the mobile device. In some such embodiments, the mobile device can transmit media content items that have not previously been transmitted to the streaming media device at 110 rather than transmitting selected media content items.

At 112, the streaming media device can receive the selected content over the peer-to-peer networking protocol. In some embodiments, streaming media device can store the received content in any suitable manner. For example, in some embodiments, the streaming media device can store the received content in memory of the streaming media device for later presentation on the display device connected to the streaming media device. In some embodiments, the streaming media device can present any suitable indication that the selected content has been received. For example, in some embodiments, the streaming media device can cause a user interface to be presented on the display device that indicates the received media content items, as shown in user interface 400 of FIG. 4. As illustrated in FIG. 4, user interface 400 can include indications of received media content items 402, each of which can correspond to a media content item transferred from the mobile device at block 110. In some embodiments, the indications of received media content items can include any suitable information or content, such as a thumbnail image associated with the media content item, a name of the media content item, a name of a creator of the media content item, and/or any other suitable information. In some embodiments, each indication of a received media content item can be a selectable input that, when selected, causes presentation of the corresponding media content item to begin on the display device, as described below in connection with blocks 114 and 118.

Note that, in instances where the media content to be presented on the display device connected to the streaming media device is to be streamed from a media content sharing and/or streaming service, the streaming media device can receive the media content item to be streamed from the service via an HTTP proxy server executing on the mobile device. That is, rather than communicating with the service via a WiFi access point, the streaming media device can communicate with the service via the HTTP proxy server to request and/or receive the media content item. In some such embodiments, the streaming media device can receive data corresponding to the media content from the mobile device (that is, via the HTTP proxy server) at 112 and can store the received data in a buffer or other temporary location on the streaming media device as the media content item is being presented on the display device connected to the streaming media device.

At 114, the streaming media device can receive a selection of a media content item stored on the streaming media device (e.g., a media content item received by the streaming media device at 112 and/or a media content item previously received by the streaming media device) and can request permission to present the selected media content item. In some embodiments, the streaming media device can receive the selection of the media content item in any suitable manner. For example, in some embodiments, the streaming media device can receive the selection of the media content item via a remote control device associated with the streaming media device. As another example, in some embodiments, the streaming media device can receive the selection of the media content item via the mobile device.

In some embodiments, the streaming media device can request permission to present the selected media content item. For example, in instances where the selected media content item is a media content item downloaded by the mobile device from a media content sharing or streaming service, the streaming media device can request permission to present the selected media content item on the display device connected to the streaming media device from the media content sharing or streaming service. In some embodiments, the streaming media device can request permission using any suitable information and using any suitable technique(s). For example, in some embodiments, the streaming media device can transmit a message to a server associated with the media content sharing or streaming service that includes any suitable information, such as information associated with a user account corresponding to the service that was used by the mobile device to download the media content item (e.g., a username associated with the user account, a password associated with the user account, and/or any other suitable information), an identifier of the selected media content item, an identifier of the mobile device, and/or any other suitable information. As another example, in some embodiments, the streaming media device can receive any suitable keys required for decryption of the selected media content item from the server in response to a request transmitted to the server. Note that, in instances where a message is transmitted to the server associated with the media content sharing or streaming service and/or in instances where a message is received from the server associated with the media content sharing or streaming service, the messages can be transmitted and/or received in any suitable manner. In some embodiments, the mobile phone can receive a request from the streaming media device and transmit said request to the media content sharing/streaming service. For example, in some embodiments, the messages can be transmitted between the streaming media device and the server using a communication network associated with the HTTP proxy server executing on the mobile device, as described above in connection with blocks 102 and 104.

At 116, the server associated with the media content sharing or streaming service can grant permission to the streaming media device to cause the selected media content item to be presented on the display device. In some embodiments, as described above in connection with block 114, in some embodiments, the server can transmit any suitable key(s) required to decrypt the selected media content item.

Note that, in some embodiments, the streaming media device may not require permission to present the selected media content item. For example, in instances where the selected media content item corresponds to user-generated media content (e.g., a video recorded by the mobile device, a document created on the mobile device, and/or any other suitable user-generated content), or content generated by another user which is hosted on a media content sharing service, the streaming media device may not require permission to present the selected content. In some such embodiments, blocks 114 and 116 can be omitted.

At 118, the streaming media device can cause the selected media content item to be presented on the display device connected to the streaming media device. In some embodiments, the streaming media device can cause the selected media content item to be presented in any suitable manner. For example, in some embodiments, video content and/or audio content associated with the media content item can be presented by a display of the display device and/or speakers of the display device, respectively. In some embodiments, playback of the selected media content item can be manipulated in any suitable manner, for example, via a remote control device associated with the streaming media device. As a more particular example, in some embodiments, a playback position of the media content item can be changed (e.g., a viewer of the media content item can fast-forward or rewind the media content item, and/or change the playback position in any other suitable manner). More detailed techniques for manipulating a playback position of the media content item are described below in connection with block 212 of FIG. 2.

Figure 2:
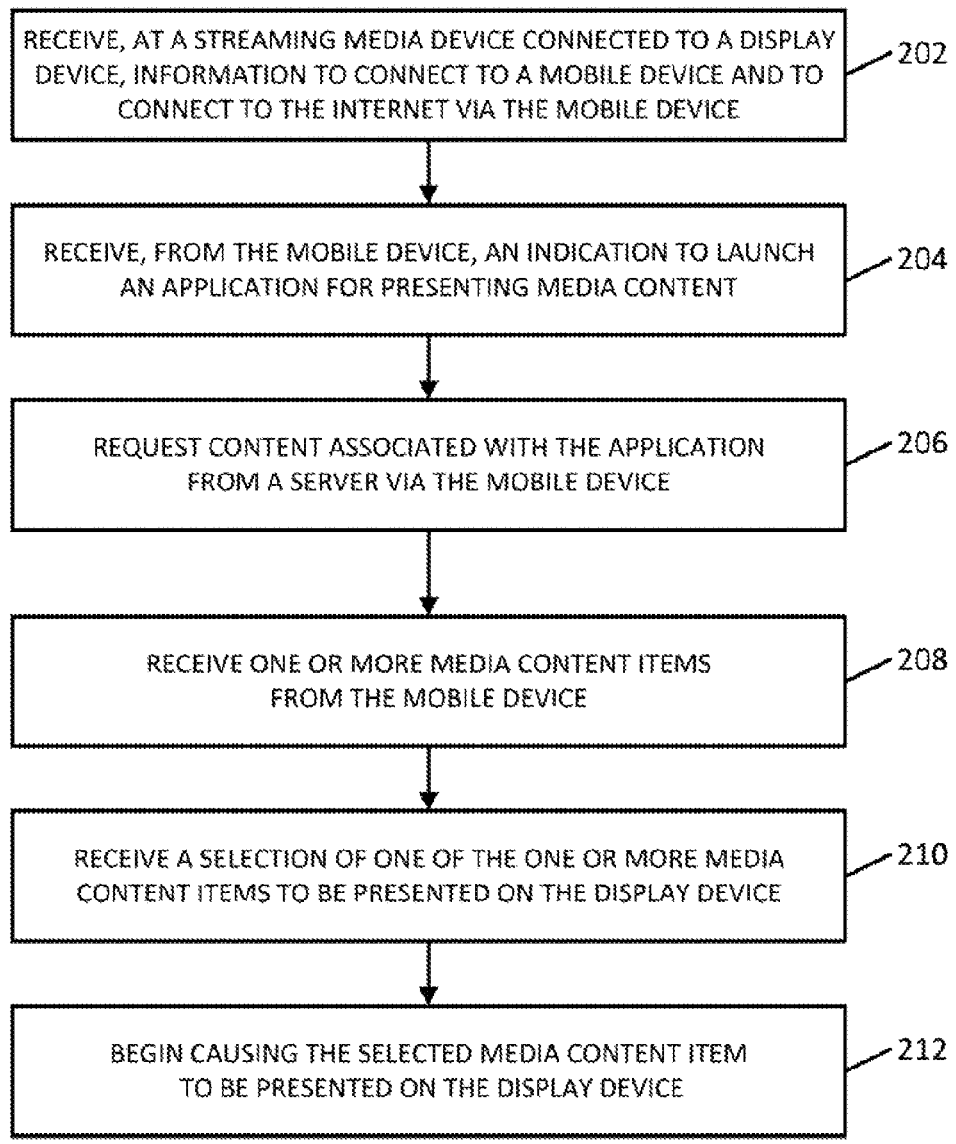
FIG. 2 shows an example of a process for transferring media content to a streaming media device and presenting media content using the streaming media device in accordance with some embodiments of the disclosed subject matter.

Turning to FIG. 2, an example 200 of a process for receiving media content by a streaming media device and causing the media content to be presented on a display device connected to the streaming media device is shown in accordance with some embodiments of the disclosed subject matter. In some embodiments, process 200 can be executed by a streaming media device.

Process 200 can begin at 202 by receiving information to be used to connect to a mobile device and/or to connect to the internet via the mobile device. For example, as described above in connection with blocks 102 and 104 of FIG. 1, in some embodiments, the information can include information for establishing a peer-to-peer networking connection between the streaming media device and the mobile device (e.g., a WiFi Direct connection, a WiFi Aware connection, and/or any other suitable type of connection), such as an SSID and/or passphrase, and/or any other suitable information. As another example, as described above in connection with blocks 102 and 104 of FIG. 1, in some embodiments, the information can include information for connecting to the internet via an HTTP proxy server executing on the mobile device, such as a mDNS message that indicates an IP address of the mobile device, and/or any other suitable information. In some embodiments, the streaming media device can, in response to receiving the information, establish a connection to the mobile device and/or to the internet via the mobile device, as described above in connection with block 104 of FIG. 1.

At 204, process 200 can receive, from the mobile device, an indication or instruction to launch an application for presenting media content. In some embodiments, the indication can be received in any suitable manner, for example, via a peer-to-peer networking connection established between the mobile device and the streaming media device, as described above in connection with block 202. In some embodiments, the application for presenting media content can be any suitable application. For example, in some embodiments, the application can be a default video player, image viewer, or document viewer suitable for viewing a particular file type or type of media content (e.g., videos, images, text documents, and/or any other suitable type of media content). As another example, in some embodiments, the application can be associated with a particular media content sharing or streaming service. As a more particular example, in some embodiments, the application can be an application suitable for viewing media content hosted by the media content sharing or streaming service that has been previously downloaded and/or that is to be streamed by the streaming media device. In some embodiments, the application can be determined in any suitable manner, for example, based on the media content item selected for presentation on a display device connected to the streaming media device by a user of the mobile device, as described above in connection with block 110 of FIG. 1.

At 206, process 200 can request content associated with the indicated application from a server associated with the indicated application. The request can be in response to receiving the instructions, and can be transmitted to the media content sharing service. For example, in instances where the application is an application for presenting media content associated with a particular media content sharing and streaming service, process 200 can request the content associated with the indicated application from a server associated with the service. In some embodiments, the content can include any suitable content, such as data and/or instructions for rendering a video player window associated with the application, and/or any other suitable type of content. The requested content may also include a request for one or more permissions for presenting the media content. In some embodiments, process 200 can request the content associated with the application from the server using any suitable technique. The request may be sent directly to the server by the streaming media device; the bandwidth requirements associated with such a request can be small as compared to the bandwidth requirements for downloading the media content item, so such a request may be transmitted directly from the streaming media device, even if the network connection is slow and/or unreliable. In other embodiments, the streaming media device may transmit a request to the mobile phone, in response to receiving the instruction or indication, to cause the mobile phone to transmit the request to the media content sharing service to render a video. In this case, the request to the media content sharing service is transmitted via the mobile phone, which may help provide access to content when there is no network connection associated with the streaming media device. For example, in some embodiments, process 200 can transmit a message to the server via a communication network corresponding to the HTTP proxy server executing on the mobile device, as described above in connection with block 202.

Note that, in some embodiments, block 206 can be omitted. For example, in instances where the application has been previously launched by the streaming media device, process 200 can access previously received content associated with the application.

At 208, process 200 can receive one or more media content items from the mobile device. For example, as described above in connection with blocks 110 and 112 of FIG. 1, in some embodiments, the received one or more media content items can be media content items that were previously downloaded to the mobile device from the media content sharing or streaming service at an earlier time of time. As another example, in some embodiments, the received one or more media content items can be media content items that were stored on the mobile device and/or that were generated on the mobile device (e.g., videos or pictures captured by the mobile device, documents created on the mobile device, and/or any other suitable type of media content items). As yet another example, in some embodiments, the one or more media content items can include a media content item that is to be streamed from a media content sharing or streaming service to the streaming device (via the mobile phone) and presented on the display device connected to the streaming media device and so is downloaded and stored in a buffer at the mobile phone during the streaming process. In some such embodiments, data corresponding to the media content item that is to be streamed can be received by streaming media device via an HTTP proxy server executing on the mobile device from a server associated with the media content sharing or streaming service. In some embodiments, process 200 can receive the one or more media content items via the peer-to-peer networking connection (e.g., a WiFi Direct connection, a WiFi Aware connection, and/or any other suitable type of connection), as described above in connection with block 202.

In some embodiments, process 200 can cause the received one or more media content items to be stored in memory of the streaming media device. In some such embodiments, the one or more media content items can be presented on the display device connected to the streaming media device in an offline mode, for example, if the peer-to-peer networking connection between the mobile device and the streaming media device is terminated and/or if the HTTP proxy server executing on the mobile device used by the streaming media device to access the internet is terminated. Additionally or alternatively, in some embodiments, in instances where the received media content items include a media content item that is to be streamed, portions of the media content item to be streamed can be stored temporarily on the streaming media device (e.g., in a buffer, and/or in any other suitable location) as the media content item to be streamed is presented.

At 210, process 200 can receive a selection of a particular media content item (e.g., one of the one or more received media content items described above in connection with block 208, and/or any other suitable particular media content item) to be presented on the display device connected to the streaming media device. In some embodiments, process 200 can receive the selection in any suitable manner. For example, in some embodiments, process 200 can receive a selection via a user interface, as described above in connection with block 114 of FIG. 1 and FIG. 4. In some embodiments, process 200 can receive the selection via a remote control associated with the streaming media device.

At 212, process 200 can begin causing the selected media content item to be presented on the display device. In some embodiments, process 200 can cause the selected media content item to be presented on the display device in any suitable manner. For example, in some embodiments, the media content item can be presented within a video player window associated with the application identified as described above in connection with block 204. In some embodiments, process 200 can cause the selected media content item to be presented in a manner in which playback of the media content item can be modified in any suitable manner. For example, in some embodiments, a viewer of the media content item can adjust a volume of the media content item, a playback position of the media content item (e.g., by fast-forwarding or rewinding the media content item, and/or in any other suitable manner), and/or modify playback of the media content item in any other suitable manner. In some embodiments, playback of the media content item can be modified using a remote control device associated with the streaming media device.

Note that, in some embodiments, in instances where a viewer of the media content item indicates that a playback position is to be changed (e.g., rewind the media content item, fast-forward the media content item, and/or change the playback position in any other suitable manner), process 200 can change the playback position using any suitable technique or combination of techniques. For example, in instances where process 200 received an entirety of the media content item at block 208 (e.g., in instances where the media content item was stored on the mobile device and transferred fully to the streaming media device), process 200 can skip to an indicated location by identifying a requested playback position and causing playback to shift to the request playback position. As another example, in instances where process 200 is streaming the media content item from a media content sharing and/or streaming service, process 200 can transmit a request to the service to transmit an updated portion of the media content item based on a requested playback position (e.g., an updated portion corresponding to a future playback position that has not yet been received by the streaming media device). As a more particular example, in some embodiments, process 200 can transmit the request to the service via an HTTP proxy server executing on the mobile device.

It should be noted that, although the embodiments described herein generally relate to presenting media content on a media playback device connected to a streaming media device without requiring a WiFi access point for the streaming media device, this is merely illustrative. For example, an operating system executing on the streaming media device may require an update file that updates the operating system. In a more particular example, when a mobile device and a streaming media device are connected (e.g., via a peer-to-peer connection), the streaming media device can transmit an indication to the mobile device to check for updates to a current version of the operating system executing on the streaming media device when a suitable network connection is available to the mobile device. In continuing this example, in response to an associated mobile device having access to an update server (e.g., via an internet connection), the mobile device can download and/or other retrieve the update file and, in turn, can transmit the update file to the streaming media device upon connecting with the streaming media device. The streaming media device can store the update file in the memory or other suitable storage device and can execute the update file that causes the operating system of the streaming media device to be updated.

Figure 5:
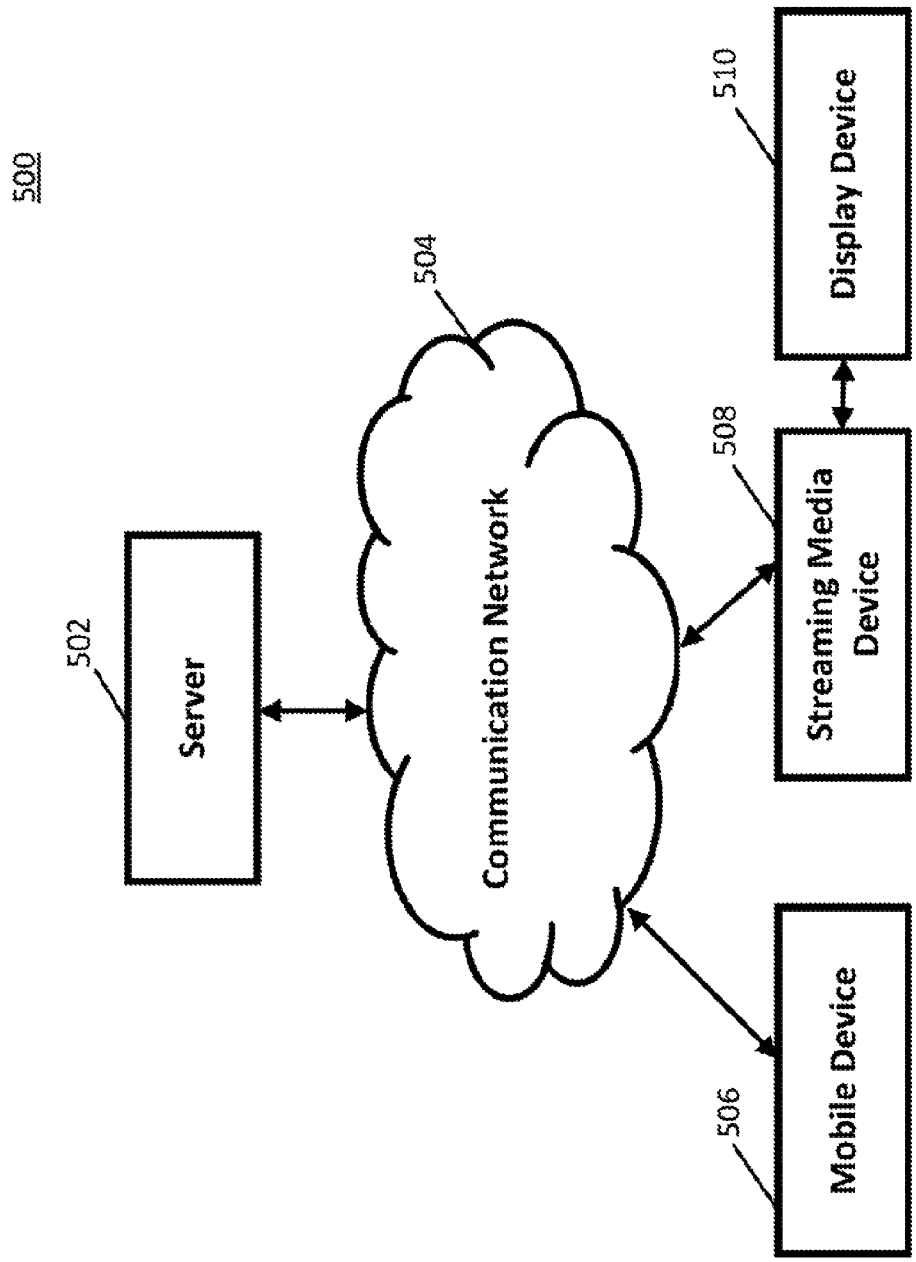
FIG. 5 shows a schematic diagram of an illustrative system suitable for implementation of mechanisms described herein for presenting media content in accordance with some embodiments of the disclosed subject matter.

Turning to FIG. 5, an example 500 of hardware for presenting media content that can be used in accordance with some embodiments of the disclosed subject matter is shown. As illustrated, hardware 500 can include a server 502, a communication network 504, a mobile device 506, a streaming media device 508, and/or a display device 510.

Server 502 can be any suitable server(s) for storing media content, information, data, programs and/or any other suitable content. For example, in some embodiments, server 502 can be associated with a media content streaming or sharing service and can host any suitable media content items (e.g., videos, television programs, movies, audio content, and/or any other suitable type of media content items) that can be viewed on user devices. As a more particular example, in some embodiments, server 502 can transmit selected media content items to a user device, such as mobile device 506. As another example, in some embodiments, server 502 can grant permission for display device 510 connected to streaming media device 508 to present a particular media content item using any suitable information and/or technique(s), such as by verifying user credentials associated with a user account corresponding to a media content sharing or streaming service provided by server 502.

Communication network 504 can be any suitable combination of one or more wired and/or wireless networks in some embodiments. For example, communication network 504 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. Mobile device 506 and streaming media device 508 can be connected by one or more communications links to communication network 504 that can be linked via one or more communications links to server 502. For example, in some embodiments, mobile device 506 can be connected to server 502 via a mobile network or cellular network. As another example, in some embodiments, streaming media device 508 can be connected to server 502 via mobile device 506. As a more particular example, in some embodiments, streaming media device 508 can be connected to mobile device 506 via a peer-to-peer networking protocol (e.g., WiFi Direct, WiFi Aware, and/or any other suitable protocol), and can thereby be connected to server 502 via a proxy server executing on mobile device 506, as described in more detail in connection with FIGS. 1 and 2. The communications links can be any communications links suitable for communicating data among mobile device 506, streaming media device 508, and server 502 such as network links, dial-up links, wireless links, hard-wired links, any other suitable communications links, or any suitable combination of such links.

In some embodiments, mobile device 506 can be any suitable type of mobile device, such as a mobile phone, a tablet computer, a laptop computer, a wearable computer, and/or any other suitable type of computer.

In some embodiments, streaming media device 508 can be any suitable type of device for storing media content and/or for causing media content to be presented on associated display device 510. In some embodiments, streaming media device 508 can have any suitable type of storage that can store media content transferred to streaming media device 508 via mobile device 506. In some embodiments, streaming media device 508 can be connected to display device 510 in any suitable manner, such as via an HDMI connection, and/or in any other suitable manner. In some embodiments, display device 510 can be any suitable type of display device, such as a television, a projector, and/or any other suitable type of display device.

Although server 502 is illustrated as one device, the functions performed by server 502 can be performed using any suitable number of devices in some embodiments. For example, in some embodiments, multiple devices can be used to implement the functions performed by server 502.

Although one mobile device 506, one streaming media device 508, and one display device 510 are shown in FIG. 5 to avoid over-complicating the figure, any suitable number of devices, and/or any suitable types of user devices, can be used in some embodiments.

Figure 6:
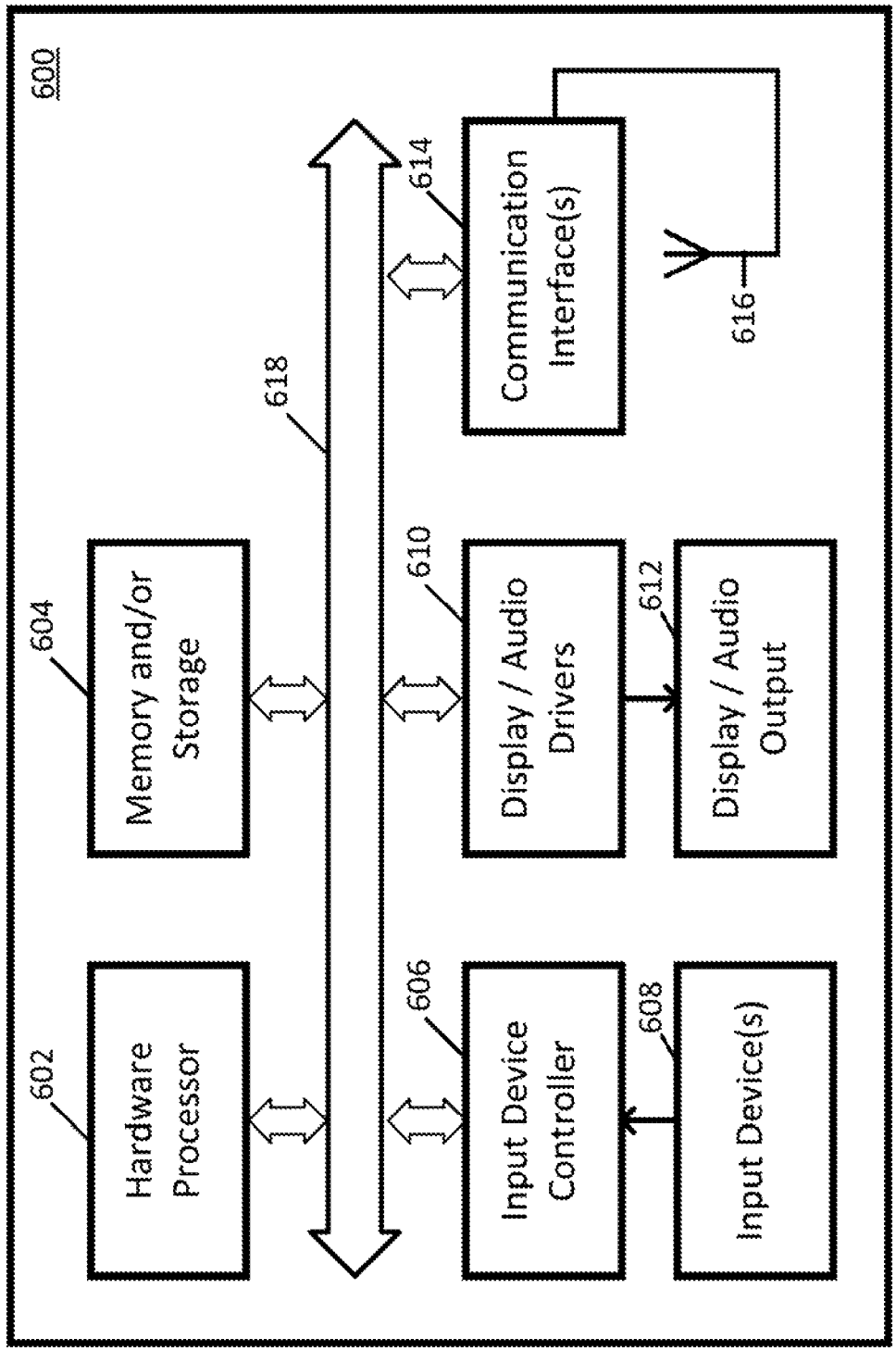
FIG. 6 shows a detailed example of hardware that can be used in a server and/or a user device of FIG. 5 in accordance with some embodiments of the disclosed subject matter.

Server 502, mobile device 506, streaming media device 508, and/or display device 510 can be implemented using any suitable hardware in some embodiments. For example, in some embodiments, devices 502 and/or 506-510 can be implemented using any suitable general purpose computer or special purpose computer. For example, a mobile phone may be implemented using a special purpose computer. Any such general purpose computer or special purpose computer can include any suitable hardware. For example, as illustrated in example hardware 600 of FIG. 6, such hardware can include hardware processor 602, memory and/or storage 604, an input device controller 606, an input device 608, display/audio drivers 610, display and audio output circuitry 612, communication interface(s) 614, an antenna 616, and a bus 618.

Hardware processor 602 can include any suitable hardware processor, such as a microprocessor, a micro-controller, digital signal processor(s), dedicated logic, and/or any other suitable circuitry for controlling the functioning of a general purpose computer or a special purpose computer in some embodiments. In some embodiments, hardware processor 602 can be controlled by a server program stored in memory and/or storage of a server, such as server 502. For example, in some embodiments, the server program can cause hardware processor 602 to transmit a media content item to mobile device 506, verify user credentials to allow presentation of a media content item on display device 510, and/or perform any other suitable functions. In some embodiments, hardware processor 602 can be controlled by a computer program stored in memory and/or storage 604 of streaming media device 508. For example, the computer program can cause hardware processor 602 to establish a connection to mobile device 506, receive and store media content transferred from mobile device 506, cause presentation of a selected media content item on display device 510, and/or perform any other suitable functions.

Memory and/or storage 604 can be any suitable memory and/or storage for storing programs, data, and/or any other suitable information in some embodiments. For example, memory and/or storage 604 can include random access memory, read-only memory, flash memory, hard disk storage, optical media, and/or any other suitable memory.

Input device controller 606 can be any suitable circuitry for controlling and receiving input from one or more input devices 608 in some embodiments. For example, input device controller 606 can be circuitry for receiving input from a touchscreen, from a keyboard, from one or more buttons, from a voice recognition circuit, from a microphone, from a camera, from an optical sensor, from an accelerometer, from a temperature sensor, from a near field sensor, from a pressure sensor, from an encoder, and/or any other type of input device.

Display/audio drivers 610 can be any suitable circuitry for controlling and driving output to one or more display/audio output devices 612 in some embodiments. For example, display/audio drivers 610 can be circuitry for driving a touchscreen, a flat-panel display, a cathode ray tube display, a projector, a speaker or speakers, and/or any other suitable display and/or presentation devices.

Communication interface(s) 614 can be any suitable circuitry for interfacing with one or more communication networks (e.g., computer network 504). For example, interface(s) 614 can include network interface card circuitry, wireless communication circuitry, and/or any other suitable type of communication network circuitry.

Antenna 616 can be any suitable one or more antennas for wirelessly communicating with a communication network (e.g., communication network 504) in some embodiments. In some embodiments, antenna 616 can be omitted.

Bus 618 can be any suitable mechanism for communicating between two or more components 602, 604, 606, 610, and 614 in some embodiments.

Any other suitable components can be included in hardware 600 in accordance with some embodiments.

In some embodiments, at least some of the above described blocks of the processes of FIGS. 1 and 2 can be executed or performed in any order or sequence not limited to the order and sequence shown in and described in connection with the figures. Also, some of the above blocks of FIGS. 1 and 2 can be executed or performed substantially simultaneously where appropriate or in parallel to reduce latency and processing times. Additionally or alternatively, some of the above described blocks of the processes of FIGS. 1 and 2 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as non-transitory forms of magnetic media (such as hard disks, floppy disks, and/or any other suitable magnetic media), non-transitory forms of optical media (such as compact discs, digital video discs, Blu-ray discs, and/or any other suitable optical media), non-transitory forms of semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Accordingly, methods, systems, and media for presenting media content are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for presenting media content, the method comprising:
    receiving, at a streaming media device connected to a display device, an instruction, from a mobile phone communicatively coupled with the streaming media device using a peer-to-peer networking protocol, to launch an application for presenting media content on the display device;
    in response to receiving the instruction, transmitting a request to a media content sharing service associated with the application for presenting media content to render a video player on the display device;
    receiving, from the mobile phone, an instruction to present a media content item on the display device using the video player;
    transmitting, to the mobile phone, a request for a first portion of the media content item, wherein a plurality of portions of the media content item including the first portion have been previously downloaded to the mobile phone;
    receiving, from the mobile phone, the first portion of the media content item using the peer-to-peer networking protocol;
    storing the first portion of the media content item in memory of the streaming media device; and
    causing the first portion of the media content item to be presented on the display device using the video player by playing the stored first portion of the media content item from the memory of the streaming media device.

2. The method of claim 1, wherein the request to the media content sharing service is transmitted using an HTTP proxy server executing on the mobile phone.

3. The method of claim 2, further comprising receiving HTTP proxy server identifier information from the mobile phone and connecting to the HTTP proxy server executing on the mobile phone prior to receiving the instruction to launch the application.

4. The method of claim 1, wherein the peer-to-peer networking protocol is a wireless fidelity (WiFi) direct protocol.

5. The method of claim 1, wherein the instruction to present the media content item is received via a selection of an indication of the media content item via a user interface presented on the display device, wherein the user interface presents indications of a plurality of media content items previously downloaded to the mobile phone that are available for presentation on the display device.

6. The method of claim 1, further comprising determining an amount of storage space available in the memory of the streaming media device, wherein the first portion of the media content item is inhibited from being stored in the memory of the streaming media device based on the determination.

7. The method of claim 1, further comprising:
    transmitting an instruction to the mobile phone to retrieve an update file corresponding to an operating system executing on the streaming media device;
    receiving, from the mobile phone, the update file using the peer-to-peer networking protocol;
    storing the update file in the memory of the streaming media device; and executing the update file from the memory of the streaming media device that causes the operating system of the streaming media device to be updated.

8. A system for presenting media content, the system comprising:
a memory; and
a hardware processor of a streaming media device that is configured to:
receive, at the streaming media device connected to a display device, an instruction, from a mobile phone communicatively coupled with the streaming media device using a peer-to-peer networking protocol, to launch an application for presenting media content on the display device;
in response to receiving the instruction, transmit a request to a media content sharing service associated with the application for presenting media content to render a video player on the display device;
receive, from the mobile phone, an instruction to present a media content item on the display device using the video player;
transmit, to the mobile phone, a request for a first portion of the media content item, wherein a plurality of portions of the media content item including the first portion have been previously downloaded to the mobile phone;
receive, from the mobile phone, the first portion of the media content item using the peer-to-peer networking protocol;
store the first portion of the media content item in the memory of the streaming media device; and
cause the first portion of the media content item to be presented on the display device using the video player by playing the stored first portion of the media content item from the memory of the streaming media device.

9. The system of claim 8, wherein the request to the media content sharing service is transmitted using an HTTP proxy server executing on the mobile phone.

10. The system of claim 9, wherein the hardware processor is further configured to receive HTTP proxy server identifier information from the mobile phone and connecting to the HTTP proxy server executing on the mobile phone prior to receiving the instruction to launch the application.

11. The system of claim 8, wherein the peer-to-peer networking protocol is a wireless fidelity (WiFi) direct protocol.

12. The system of claim 8, wherein the instruction to present the media content item is received via a selection of an indication of the media content item via a user interface presented on the display device, wherein the user interface presents indications of a plurality of media content items previously downloaded to the mobile phone that are available for presentation on the display device.

13. The system of claim 8, wherein the hardware processor is further configured to determine an amount of storage space available in the memory of the streaming media device, wherein the first portion of the media content item is inhibited from being stored in the memory of the streaming media device based on the determination.

14. The system of claim 8, wherein the hardware processor is further configured to:
transmit an instruction to the mobile phone to retrieve an update file corresponding to an operating system executing on the streaming media device;
receive, from the mobile phone, the update file using the peer-to-peer networking protocol;
store the update file in the memory of the streaming media device; and
execute the update file from the memory of the streaming media device that causes the operating system of the streaming media device to be updated.

15. A non-transitory computer-readable medium containing computer executable instructions that, when executed by a processor, cause the processor to perform a method for presenting media content, the method comprising:
receiving, at a streaming media device connected to a display device, an instruction, from a mobile phone communicatively coupled with the streaming media device using a peer-to-peer networking protocol, to launch an application for presenting media content on the display device;
in response to receiving the instruction, transmitting a request to a media content sharing service associated with the application for presenting media content to render a video player on the display device;
receiving, from the mobile phone, an instruction to present a media content item on the display device using the video player;
transmitting, to the mobile phone, a request for a first portion of the media content item, wherein a plurality of portions of the media content item including the first portion have been previously downloaded to the mobile phone;
receiving, from the mobile phone, the first portion of the media content item using the peer-to-peer networking protocol;
storing the first portion of the media content item in memory of the streaming media device; and
causing the first portion of the media content item to be presented on the display device using the video player by playing the stored first portion of the media content item from the memory of the streaming media device.

16. The non-transitory computer-readable medium of claim 15, wherein the request to the media content sharing service is transmitted using an HTTP proxy server executing on the mobile phone.

17. The non-transitory computer-readable medium of claim 16, wherein the method further comprises receiving HTTP proxy server identifier information from the mobile phone and connecting to the HTTP proxy server executing on the mobile phone prior to receiving the instruction to launch the application.

18. The non-transitory computer-readable medium of claim 15, wherein the peer-to-peer networking protocol is a wireless fidelity (WiFi) direct protocol.

19. The non-transitory computer-readable medium of claim 15, wherein the instruction to present the media content item is received via a selection of an indication of the media content item via a user interface presented on the display device, wherein the user interface presents indications of a plurality of media content items previously downloaded to the mobile phone that are available for presentation on the display device.

20. The non-transitory computer-readable medium of claim 15, wherein the method further comprises determining an amount of storage space available in the memory of the streaming media device, wherein the first portion of the media content item is inhibited from being stored in the memory of the streaming media device based on the determination.

21. The non-transitory computer-readable medium of claim 15, wherein the method further comprises:
- transmitting an instruction to the mobile phone to retrieve an update file corresponding to an operating system executing on the streaming media device;
- receiving, from the mobile phone, the update file using the peer-to-peer networking protocol;
- storing the update file in the memory of the streaming media device; and
- executing the update file from the memory of the streaming media device that causes the operating system of the streaming media device to be updated.

* * * * *